UNITED STATES PATENT OFFICE.

JACOB KING, OF INDIANAPOLIS, INDIANA.

IMPROVEMENT IN TEETH FOR AGRICULTURAL IMPLEMENTS.

Specification forming part of Letters Patent No. 148,218, dated March 3, 1874; application filed August 5, 1873.

*To all whom it may concern:*

Be it known that I, JACOB KING, of Indianapolis, in the county of Marion and State of Indiana, have invented certain new and useful Improvements in Teeth for Agricultural Implements; and I do hereby declare the following to be a full, clear, and exact description of the invention, such as will enable others skilled in the art to which it pertains to make and use it, reference being had to the accompanying drawings, which form part of this specification.

The nature of my invention relates to an improvement in teeth for grain-drills, corn-planters, cultivators, and all similar implements; and it consists in securing the tooth in position by means of a recessed collar, which has a number of notches formed around the edge of the recess, in which a lug formed upon the under side of the flange upon the tooth catches, so as to retain the tooth in position, and to allow it to be set at any desired angle, as will be more fully described hereafter.

The accompanying drawings represent my invention.

$a$ represents a hollow tooth, designed to be used upon agricultural implements of various kinds, having the flange $c$ formed around its top, upon the under side of which is a lug, $e$. The tooth is secured in position by means of the recessed collar or washer $g$, which passes up over it, and is then screwed to the beam above. The recess $i$, formed in the top of the collar, is just large and deep enough to receive the flange $c$, and has a number of notches, $o$, formed around its edge, in which the lug $e$ catches, so as to retain the tooth firmly in position.

By changing the lug from one notch to the other, the tooth can be set at any desired angle, and will be held rigidly in position.

Having thus described my invention, I claim—

The drill-tooth $a$, having flange $c$ formed around its top, and the lug $e$, in combination with collar $g$, having the recess $i$ formed in its upper surface to receive the flange, and notches $o$ to receive the lugs, substantially as described.

In testimony that I claim the foregoing I have hereunto set my hand this 31st day of July, 1873.

JACOB KING.

Witnesses:
FORTUNE L. BAILEY,
FRANK C. FRY.

J. KINZER.
Seal Bolts.
No. 148,219. Patented March 3, 1874.
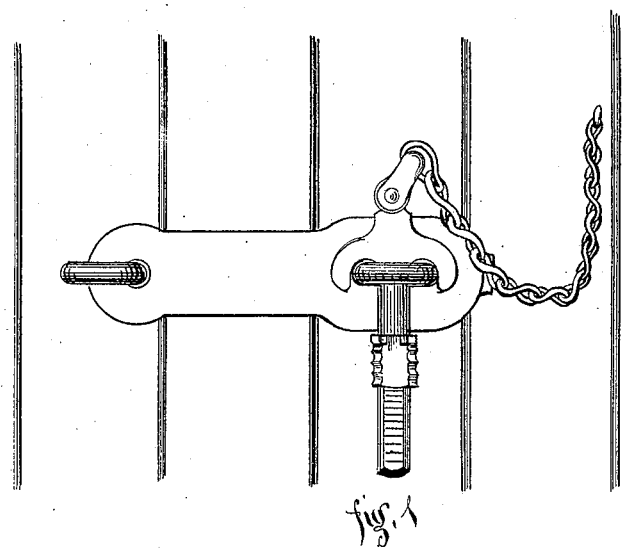
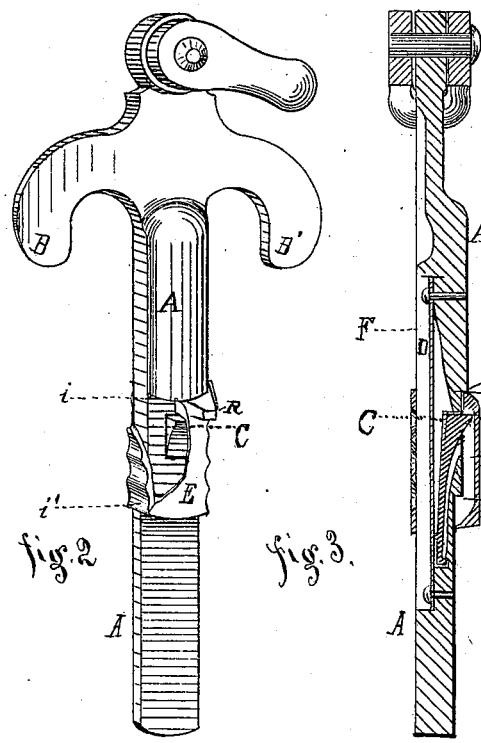
Witnesses: James H. Collins, Harry Coleman
Inventor: Jacob Kinzer